(12) United States Patent
Theodoulou et al.

(10) Patent No.: US 11,453,608 B2
(45) Date of Patent: Sep. 27, 2022

(54) METHOD FOR PRE-CONDITIONING SLUDGE

(71) Applicant: BL TECHNOLOGIES, INC., Minnetonka, MN (US)

(72) Inventors: Michael David Theodoulou, Oakville (CA); Dorian Harrison, Mansfield (GB); Marion Debacker, Mansfield (GB)

(73) Assignee: BL TECHNOLOGIES, INC., Minnetonka, MN (US)

( * ) Notice: Subject to any disclaimer, the term of this patent is extended or adjusted under 35 U.S.C. 154(b) by 0 days.

(21) Appl. No.: 16/612,010

(22) PCT Filed: May 9, 2018

(86) PCT No.: PCT/US2018/031914
§ 371 (c)(1),
(2) Date: Nov. 8, 2019

(87) PCT Pub. No.: WO2018/208999
PCT Pub. Date: Nov. 15, 2018

(65) Prior Publication Data
US 2020/0062629 A1 Feb. 27, 2020

Related U.S. Application Data

(60) Provisional application No. 62/504,836, filed on May 11, 2017.

(51) Int. Cl.
*C02F 3/28* (2006.01)
*C02F 11/04* (2006.01)
(Continued)

(52) U.S. Cl.
CPC ............... *C02F 11/18* (2013.01); *C02F 3/006* (2013.01); *C02F 3/282* (2013.01); *C02F 3/286* (2013.01);
(Continued)

(58) Field of Classification Search
CPC C02F 3/282; C02F 3/286; C02F 11/18; C02F 11/04; C02F 11/185; C02F 2209/02;
(Continued)

(56) References Cited

U.S. PATENT DOCUMENTS 5,288,405 A * 2/1994 Lamb, III ............... C02F 3/006
 210/906
5,525,229 A * 6/1996 Shih ........................ C12M 45/20
 210/603

(Continued)

FOREIGN PATENT DOCUMENTS

GB 2496723 A 5/2013
JP 4908016 B2 4/2014
(Continued)

OTHER PUBLICATIONS

Vanrolleghem et al., "On-line monitoring equipment for wastewater treatment processes: state of the art", Water Science and Technology, vol. 47, Issue: 2, Jan. 2003, pp. 1-34.
(Continued)

*Primary Examiner* — Joseph W Drodge

(57) ABSTRACT

Sludge, for example primary sludge or waste activated sludge or both from a wastewater treatment plant, is pretreated prior to anaerobic digestion. The pre-treatment includes an optional mechanical treatment to reduce the viscosity of the sludge and a biological hydrolysis treatment. The biological hydrolysis treatment may be performed in a series of reactors some of which are maintained at a temperature in the range of 50 to 70° C. The reactors provide a
(Continued)

combined residence time in the range of 0.5 to 6 days. Optionally, measurements of the pH of the sludge during or after biological hydrolysis, or the production of biogas from a downstream anaerobic digester, may be considered in adjusting the temperature of one or more of the biological hydrolysis reactors.

17 Claims, 1 Drawing Sheet

(51) Int. Cl.
*C02F 11/18* (2006.01)
*C02F 3/00* (2006.01)

(52) U.S. Cl.
CPC ............ *C02F 11/04* (2013.01); *C02F 11/185* (2013.01); *C02F 2209/02* (2013.01); *C02F 2209/06* (2013.01); *C02F 2209/38* (2013.01); *C02F 2209/44* (2013.01); *C02F 2301/08* (2013.01); *C02F 2301/106* (2013.01)

(58) Field of Classification Search
CPC .............. C02F 2209/06; C02F 2209/38; C02F 2209/44; C02F 2301/08; C02F 2301/106; C02F 1/34; C02F 3/006; C02F 3/12; C02F 3/1205; C02F 3/121; C02F 3/28; C02F 11/13; C02F 2301/10; Y02E 50/30
USPC ........................... 210/612, 709, 743, 97, 613
See application file for complete search history.

(56) References Cited

U.S. PATENT DOCUMENTS

| | | | |
|---|---|---|---|
| 5,785,852 A | 7/1998 | Rivard et al. | |
| 6,929,744 B2 | 8/2005 | Le | |
| 7,452,466 B2* | 11/2008 | Binning | C02F 11/04 |
| | | | 210/603 |
| 8,043,505 B2 | 10/2011 | Noguchi et al. | |
| 8,758,615 B2 | 6/2014 | Smith | |
| 8,911,627 B2 | 12/2014 | Johnson | |
| 9,156,069 B2 | 10/2015 | Toll et al. | |
| 2013/0137153 A1* | 5/2013 | Elbeshbishy | C12M 27/16 |
| | | | 435/168 |
| 2015/0096343 A1 | 4/2015 | Pieper et al. | |
| 2016/0326038 A1 | 11/2016 | Crampon et al. | |
| 2018/0086656 A1* | 3/2018 | Murthy | C02F 11/12 |

FOREIGN PATENT DOCUMENTS

| | | | |
|---|---|---|---|
| WO | 2005051852 A1 | 6/2005 | |
| WO | 2014062137 A1 | 4/2014 | |
| WO | 2014154466 A1 | 10/2014 | |

OTHER PUBLICATIONS

Wang et al., "Studies on Anaerobic Digestion Mechanism: Influence of Pretreatment Temperature on Biodegradation of Waste Activated Sludge", Environmental Technology, vol. 18, Issue:10, 1997, pp. 999-1008.
Cheng Y et al., "Rheological behavior of sewage sludge with high solid content", Water Science and Technology, vol. 71, Issue:11, Jun. 2015, pp. 1686-1693.
International Application No. PCT/US2018/031914, International Search Report and Written Opinion, dated Jul. 10, 2018.
Ge et al., "Temperature phased anaerobic digestion increases apparent hydrolysis rate for waste activated sludge", Water Research,vol. 45, No. 4, Feb. 1, 2011 (Feb. 1, 2011), p. 1597-1606.
International Application No. PCT/US2018/031914, International Preliminary Report on Patentability, dated Nov. 21, 2019.
European Patent Application No. 18727583.9, Communication pursuant to Rules 161(1) and 162 EPC, dated Dec. 18, 2019.
Ge et al., "Temperature Phased Anaerobic Digestion Increases Apparent Hydrolysis Tate for Waste Activated Sludge," Water Research, Feb. 2011, vol. 45(4), 1597-1606.
Indian Patent Application No. 201937045643, Examination Report dated Apr. 7, 2021.
European Patent Application No. 18727583.9, Office Action dated Nov. 30, 2021.
Brazilian Patent Application No. BR112019023492-6, Office Action dated Apr. 14, 2022.

* cited by examiner

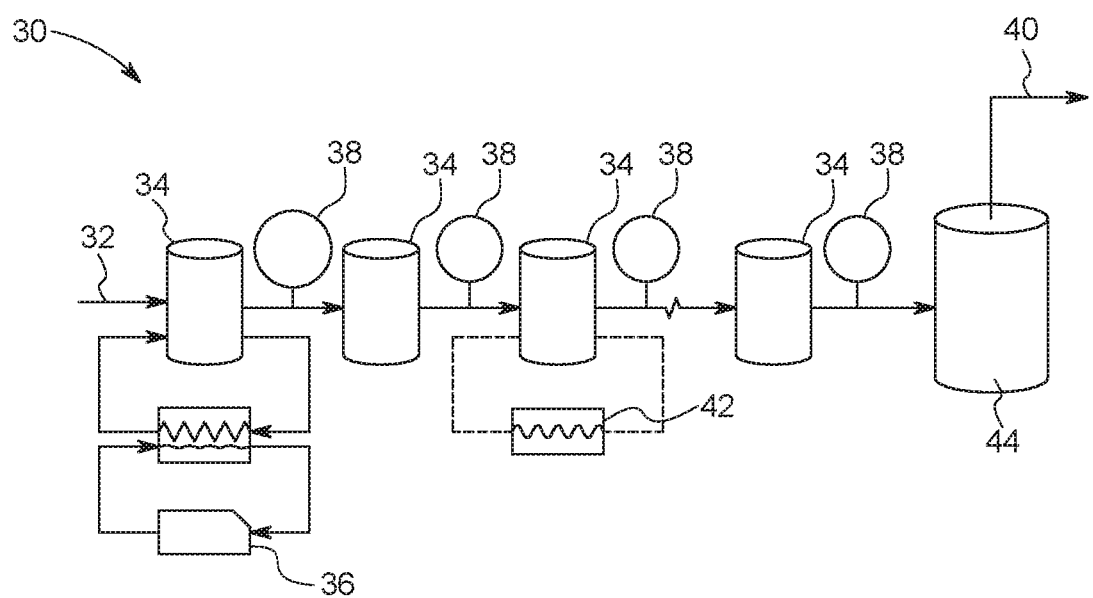

METHOD FOR PRE-CONDITIONING SLUDGE

CROSS-REFERENCE TO RELATED APPLICATIONS

This application is a National Stage Entry of International Application No. PCT/US2018/031914, filed May 9, 2018, which is a non-provisional application of U.S. Application Ser. No. 62/504,836, filed May 11, 2017, which is incorporated by reference.

FIELD

This specification relates to treating sludge, for example by hydrolysis, prior to anaerobic digestion.

BACKGROUND

A wastewater treatment plant (WWTP) typically produces primary sludge and waste activated sludge, alternatively called secondary sludge. One or both of the sludges may be further treated in an anaerobic digester. Optionally, one or both of the sludges may be thickened up to about 6 wt % dried solids. The digester is usually a mesophilic anaerobic digester. The digestate from a mesophilic anaerobic digester is a Class B (US) or European Conventionally Treated biosolid.

U.S. Pat. No. 6,929,744, Sludge Treatment at a Mesophilic Temperature, describes a method of pre-treating sewage sludge before anaerobic digestion. In the pre-treatment, the sludge is incubated at a temperature in the mesophilic range (between 25° C. and 45° C.) for 1 to 4 days while passing through a plug flow reactor. This temperature is believed to reduce the pathogen content of the sludge.

In a commercial process used by United Utilities and Monsal (now Suez Water Technologies & Solutions), sludge is fed initially at 6-8% total solids (TS) through a series of six serial flow reactors, which approximates plug flow. The sludge is treated as a batch in each reactor and, after a period of time, transferred to the next reactor until discharged from the last reactor. The reactors are maintained at 42° C. The total retention time of the reactors is 2-3 days. This pre-treatment is followed by anaerobic digestion for 12 days at 35° C. The pre-treatment increase the secretion of enzymes by bacteria present in the sludge to thereby treat the sludge by way of biological hydrolysis, alternatively called enzymic hydrolysis. In Monsal Enzymic Hydrolysis—New Developments and Lessons Learnt (S. Bungay and M. Abdelwahab, 13th European Biosolids and Organic Resources Conference and Workshop), the authors state that the rate of an enzyme-controlled reaction begins to fall of at 40° C. and ceases altogether at 60° C.

In a variation of the process described above, the sludge is heated in the fourth reactor to 55° C. After reaching this temperature, the sludge is transferred to only one of either the fifth or sixth reactor, held at 55° C., and then discharged. This alternative process is said to provide thermal pasteurization. The total residence time for the pasteurization portion of the process is about 24 hours, which considering the time required for heating and transfers produces a hold time at 55° C. of about 5 hours. The combination of enzymic hydrolysis and thermal pasteurization (sometimes called enhanced hydrolysis) produces European Enhanced Treated biosolids.

INTRODUCTION

This specification describes a system and process for pre-treating sludge before anaerobic digestion optionally involving biological hydrolysis. The sludge may be primary sludge, waste activated sludge, or a combination of them. The sludge is initially treated at a hybrid temperature between mesophilic and thermophilic, for example at a temperature that is more than 45° C., optionally 60° C. or more, and not more than 70° C., optionally not more than 62° C. For example, the temperature may be in a range from 50-70° C. or 50-65° C. or 55-62° C. The sludge may be initially treated at the hybrid temperature for 0.5 to 3 days, which may include a hold time of at least 4.8 hours at the hybrid temperature.

Optionally, the sludge may be maintained at the hybrid temperature throughout the pre-treatment, for example for 1 to 6 days. In another alternative, the sludge is pre-treated first at the hybrid temperature, for example for 0.5 to 3 days, and secondly at a mesophilic temperature, for example in a range from 35-50° C. or 40-45° C., for example for 0.3 to 3 days. Optionally, the pre-treatment temperature may be adjusted based on measurements of one or more parameters indicating the extent of hydrolysis or acidification of the sludge prior to the downstream digestion phase. The parameter may be, for example, pH of the pre-treated sludge or biogas production in a downstream digester. The pre-treatment may be provided in batches in between 4 and 9 reactors in series (i.e. serial flow reactors). The first reactor is heated to the hybrid temperature. Optionally, the sludge may be heated to the hybrid temperature in the first reactor and allowed to cool naturally in the downstream reactors. Optionally, the temperature of one or more subsequent reactors is actively varied, for example using a heat exchanger, to increase or decrease the temperature of the sludge.

BRIEF DESCRIPTION OF THE FIGURES

FIG. 1 is process flow diagram of a treatment system.

DETAILED DESCRIPTION

Conventional anaerobic digesters perform all phases of digestion within a single tank. The tank may be maintained at mesophilic or thermophilic temperatures. The conditions of the single tank may not be optimal for all phases of anaerobic digestion. The phase that limits the overall rate of the process may be the hydrolysis of sludge.

A treatment system as described herein may be used to treat sludge, for example one or more sludges from a wastewater treatment plant (WWTP), prior to treatment in an anaerobic digester such as a mesophilic anaerobic digester. Treatment in the anaerobic digester provides methanogenesis and may also provide at least some acidogenesis, acetogenesis and/or hydrolysis. The one or more sludges may have a dried solids (DS) or total solids (TS) concentration of 1-7% or 1-6%, possibly after some thickening typically performed in a WWTP. Optionally, the one or more sludges may be further thickened, for example to within a range from 7% dried solids (DS) to 12% DS before they are treated in the system.

Without intending to be limited by theory, the inventors believe that the system provides biological hydrolysis, also called enzymic hydrolysis, and possibly some pasteurization, acetogenesis or acidogenesis. Biological hydrolysis uses heating while the sludge is acidic (which typically occurs naturally) to increase the production of enzymes from naturally occurring organisms in the sludge. In the presence of the enzymes, the sludge is hydrolyzed rapidly. Although biological hydrolysis has been reported to cease at 60° C., the inventors have observed a reduction of volatile solids at 62° C., which suggests that biological hydrolysis of WWTP sludge, or at least activated sludge, may still occur at this temperature. The terms biological hydrolysis and enzymic hydrolysis will be used herein to refer to processes that maintain the sludge under anaerobic conditions (but prior to being mixed with additional active microorganisms as in an anaerobic digester) including at temperatures over 60° C., although it is possible that some other process or processes are instead occurring.

Further, the inventors have observed that when conducted at mesophilic temperatures (i.e. 42-45° C.), biological hydrolysis may be less effective on waste activated sludge than on primary sludge. However, biological hydrolysis of waste activated sludge appears to increase at higher temperatures, for example temperatures in the range of 55° C. to 62° C. Providing a hold time of, for example, at least 24 hours at 55° C. or more; at least 4.8 hours at 60° C. or more; at least 3.5 hours at 61° C. or more; or at least 2.5 hours at 62° C. or more, while TS of the sludge is 7% or less, also produces US EPA Class A biosolids.

FIG. 1 shows a system 30 for treating sludge. Feed sludge 32 enters a set of reactors 34. The feed sludge 32 may comprise waste activated sludge or a mixture of waste activated sludge and primary sludge. The reactors 34 may be serial flow reactors. The sludge 32 may be held in each reactor 34 for a period of time before being transferred to the next downstream reactor 34 or discharged from the last reactor 34. The first reactor 34 is heated, for example to more than 45° C., via heat source 36. Optionally, the first reactor 34 may be heated to between 50° C. and 70° C., for example 55, 60, 61 or 62° C. Optionally, the other reactors 34 are not actively heated or cooled and but the sludge may cooled naturally as it passes through them. The sludge 32 preferably passes through at least some and optionally all of reactors 34 in series (i.e. so as to provide a series of sequential batch reactions). The number of reactors 34 may be, for example, between 4 and 9. The total residence time in all of the reactors 34 combined may be between 1 and 6 days, preferably between 2 and 4 days. The reactors 34 may provide a hold time of 4.8 hours or more at a temperature of 60° C. while the sludge has a TS of less than 7%, or more or another combination of time and temperature meeting US EPA requirements for Class A biosolids.

Upon exiting one or more of reactors 34, the pH of sludge 32 may be measured, for example using an inline pH meter 38. Additionally or alternatively, biogas 40 output from the anaerobic digester 44 may be monitored. Based on one or more of the pH and biogas measurements, the temperature to which the first reactor 34 is heated can be altered. Optionally, the temperature of one or more subsequent reactors 34 can also or be altered, with or without control based on one or more of the pH and biogas measurements of the temperature of the first reactor 34. Optionally a heating or cooling source 42 can be added at any of the reactors 34, or shared between reactors 34, to alter the temperature of one or more reactors 34. In one example, a first reactor 34 is heated to a temperature over 45° C., for example between 50 and 70° C. or 50-65° C. A subsequent reactor 34 is either heated to maintain this temperature or actively cooled or allowed to cool naturally such that some of the reactors 34 have a temperature between 35-50° C. or 40-45° C. Collectively, the reactors 34 optionally maintain the sludge under anaerobic conditions at a temperature over 45° C., for example between 50-70° C. or 50-65° C. for 1 to 6 days; at 50-70° C. or 50-65° C. for 0.5 to 3 days and then at 35-50° C. or 40-45° C. for 0.3 to 3 days; or under conditions that include a hold of at least 24 hours at 55° C. or more or a hold of at least 4.8 hours at a 60° C. or more.

The operating temperature of a reactor 34 is believed to impact the rate of sludge hydrolysis. Temperature may change the physical characteristics of the sludge, as well as enzyme activity. The system 30 provides flexibility to operate a biological hydrolysis process such that the temperature range can be adjusted based on real time information indicating the rate of hydrolysis. In some cases, the anaerobic digester 44 may be only required to perform acidogenesis and methanogenisis or possibly only methanogenesis.

Alternatively, biological hydrolysis or any of the processes described herein can be performed in a single stage tank, or in an internally baffled tank configured to induce plug flow.

Optionally, the sludge may be treated by way of a mechanical or thermo-mechanical treatment prior to transferring the sludge to the first reactor 34. For example, the sludge may be treated by high shear mixing. The high shear mixing may reduce the viscosity of the sludge as well as heating it. Alternatively, the mechanical or thermo-mechanical treatment may include steam injection or use of a venturi to induce sudden pressure drop in the sludge, or other viscosity reducing method or device. Reducing the viscosity of the sludge is useful, in particular, if sludge is concentrated to more than 6% or more than 7% TS before being transferred to the first reactor 34. Optionally, the mechanical or thermo-mechanical treatment heats the sludge to less than 70° C.; less than 65° C.; or less than 60° C.

In one experimental trial, enzymic hydrolysis at various temperatures was tested on waste activated sludge from a conventional activated sludge wastewater treatment plant. The sludge was kept under anaerobic conditions in a jar and mixed periodically while being maintained at various temperatures. The sludge had an initial volatile solids (VS) concentration of 4.8 g/L. Measurements of VS after 3 days were: 4.1 g/L for treatment at 35° C.; 3.8 g/L for treatment at 42° C. and 3.5 g/L for treatment at 55° C.

In another experimental trial, enzymic hydrolysis at various temperatures was tested on waste activated sludge from a membrane bioreactor treating municipal wastewater with a solids retention time (SRT) of 15 days. The sludge was kept under anaerobic conditions in a jar and mixed periodically while being maintained at various temperatures. The sludge had an initial volatile solids (VS) concentration of 7.4 g/L. Measurements of VS after 2 days were: 6.8 g/L for treatment at 35° C.; 6.3 g/L for treatment at 55° C. and 6.1 g/L for treatment at 62° C.

In another experimental trial, combined primary and secondary sludge was pre-treated for 3 days. The sludge was kept under anaerobic conditions in a jar and mixed periodically while being maintained at various temperatures. The sludge was then subjected to a biomethane potential (BMP) test involving 30 days of anaerobic digestion in a bench scale reactor to measure methane production and solids reduction. Measurements of VS reduction after 30 days of anaerobic digestion were: 22.6% for pre-treatment at 42° C.; 24.2% for pre-treatment initially at 42° C. and subsequently at 45° C.; 25.1% for pre-treatment initially at 55° C. and subsequently at 42° C.; and, 24.5% for pre-treatment at 55° C. Measurements of methane production after 30 days of anaerobic digestion per unit of VS fed to the digester were: 433.4 $mLCH_4/gVS$ for pre-treatment at 42° C.; 435.3 $mLCH_4/gVS$ for pre-treatment initially at 42° C. and subsequently at 45° C.; 482.0 $mLCH_4/gVS$ for pre-treatment initially at 55° C. and subsequently at 42° C.; and, 455.7 $mLCH_4/gVS$ for pre-treatment at 55° C. For the trials at two temperatures, the initial temperature was applied for about half of the 3-day pretreatment period.

In another experimental trial, a pilot plant was fed continuously with 340 L/day of combined WWTP sludge (170 L/day of raw primary sludge at 30 g/L and 170 L/day of thickened secondary (waste activated) sludge at 35 g/). Pretreatment A consisted of 3 days of enzymic hydrolysis at 42° C. Pretreatment B consisted of 1.8 days of enzymic hydrolysis mostly at 42° C. but including 5 hours at 61° C. at the end of the pretreatment (and some time being heated from 42° C. to 61° C.). After pretreatment, the sludge was treated in an anaerobic digester with a 12 day residence time at 37° C. With pretreatment A, the digester produced 318 $m^3$/dts of biogas and 54% volatile solids reduction (VSR). With pretreatment B, the digester produced 324 $m^3$/dts of biogas and 51% VSR. For comparison, an equivalent combined sludge is normally treated (without pretreatment) at the site in an anaerobic digester with a 22 day residence time at 37° C. and produces about 350 $m^3$/dts of biogas and 44% VSR. The biosolids produced with pretreatment B meet US EPA Class A biosolids requirements for direct land application based on the provision of a 5 hour hold at 61° C. In addition, samples of the biosolids produced with either pretreatment A or pretreatment B had measured pathogen levels that could meet US EPA Class A biosolids requirements if they were consistently present in field tests.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

We claim:

1. A method for pre-treating a wastewater treatment plant (WWTP) sludge comprising waste activated sludge before anaerobic digestion, the method comprising the steps of:
   initially maintaining the WWTP sludge comprising waste activated sludge under anaerobic conditions at a temperature in the range of 55 to 62° C. for a period of between 0.5 and 3 days and subsequently maintaining the WWTP sludge comprising waste activated sludge under anaerobic conditions at a temperature in the range of 35 to 70° C. for a period of between 0.5 and 3 days; or,
   maintaining the WWTP sludge comprising waste activated sludge under anaerobic conditions at a temperature in the range of 35 to 70° C. for a period of between 1 and 6 days including holding the WWTP sludge comprising waste activated sludge within the period at a temperature of at least 55° C. for 24 hours or more.

2. The method of claim 1 wherein the wastewater treatment plant (WWTP) sludge comprising waste activated sludge is subsequently maintained at a temperature in the range of 35 to 50° C.

3. The method of claim 1 wherein the wastewater treatment plant (WWTP) sludge comprising waste activated sludge is held at a temperature of at least 55° C. for 24 hours or more.

4. The method of claim 1 further comprising adjusting one or both of the initial or subsequent temperature considering measurements of one or both of pH of the wastewater treatment plant (WWTP) sludge comprising waste activated sludge during or after pre-treatment or biogas production in a downstream digester.

5. The method of claim 4 further comprising adjusting one or both of the initial or subsequent temperature considering measurements of pH of the wastewater treatment plant (WWTP) sludge comprising waste activated sludge during or after pre-treatment.

6. The method of claim 4 further comprising adjusting one or both of the initial or subsequent temperature considering measurements of biogas production in a downstream digester.

7. The method of claim 1 wherein the pre-treating sludge comprises passing the wastewater treatment plant (WWTP) sludge comprising waste activated sludge in series through between 4 and 9 reactors.

8. The method of claim 7 comprising heating the first reactor to the initial temperature.

9. The method of claim 7 comprising heating or cooling at least one downstream reactor.

10. The method of claim 1 comprising treating the wastewater treatment plant (WWTP) sludge comprising waste activated sludge by way of a mechanical or thermo-mechanical treatment prior to the step of initially maintaining the wastewater treatment plant (WWTP) sludge comprising waste activated sludge under anaerobic conditions.

11. The method of claim 10 comprising mixing the wastewater treatment plant (WWTP) sludge comprising waste activated sludge at a sufficient shear to reduce the viscosity of the wastewater treatment plant (WWTP) sludge comprising waste activated sludge and to heat the wastewater treatment plant (WWTP) sludge comprising waste activated sludge.

12. The method of claim 10 wherein the mechanical or thermo-mechanical treatment heats the wastewater treatment plant (WWTP) sludge comprising waste activated sludge to less than 70° C.

13. The method of claim 10 wherein the mechanical or thermo-mechanical treatment heats the wastewater treatment plant (WWTP) sludge comprising waste activated sludge to less than 65° C.

14. The method of claim 10 wherein the mechanical or thermo-mechanical treatment heats the wastewater treatment plant (WWTP) sludge comprising waste activated sludge to less than 60° C.

15. The method of claim 1 wherein the wastewater treatment plant (WWTP) sludge comprising waste activated sludge is subsequently maintained at a temperature in the range of 40 to 45° C.

16. A method for pre-treating a wastewater treatment plant (WWTP) sludge comprising primary sludge and waste activated sludge before anaerobic digestion, the method comprising the steps of
   initially maintaining the WWTP sludge comprising primary sludge and waste activated sludge under anaerobic conditions at a temperature of 55° C. for a period of 1.5 days and subsequently maintaining the WWTP sludge under anaerobic conditions at a temperature of 42° C. for a period of 1.5 days; and subsequently treating the WWTP sludge comprising primary sludge and waste activated sludge in an anaerobic digester.

17. The method of claim 16, wherein the anaerobic digester is a mesophilic anaerobic digester.

* * * * *